United States Patent [19]

Boettcher et al.

[11] 4,450,987
[45] May 29, 1984

[54] PORTION CONTROL LIQUID DISPENSER

[75] Inventors: William C. Boettcher, Foley; Richard B. Volkmer, Wentzville; Wayne R. Wehde, Winfield, all of Mo.

[73] Assignee: D.O.V.E. Equipment Corporation, Winfield, Mo.

[21] Appl. No.: 255,278

[22] Filed: Apr. 17, 1981

Related U.S. Application Data

[63] Continuation-in-part of Ser. No. 87,986, Oct. 25, 1979, abandoned.

[51] Int. Cl.³ .......................... B67D 3/00; G04C 23/38
[52] U.S. Cl. .................................. 222/641; 222/105; 222/146 C; 222/504
[58] Field of Search .............. 222/60, 61, 62, 96, 222/100, 105, 146 C, 425, 450, 453, 504, 544, 570, 183, 95, 107, 640, 641; 215/12 A, 13 R; 220/404, 401

[56] References Cited

U.S. PATENT DOCUMENTS

| | | | |
|---|---|---|---|
| 1,489,059 | 4/1924 | Brainard | 215/12 A |
| 2,609,974 | 9/1952 | Brous | 222/453 |
| 3,152,728 | 10/1964 | McCarter | 222/146 C |
| 3,248,011 | 4/1966 | Brodsky et al. | 222/146 C |
| 3,848,775 | 11/1974 | Posell | 222/504 |
| 3,976,222 | 8/1976 | Spagnolo | 222/641 |
| 4,278,186 | 7/1981 | Williamson | 222/641 |

FOREIGN PATENT DOCUMENTS 400763 11/1933 United Kingdom .

Primary Examiner—F. J. Bartuska
Attorney, Agent, or Firm—Lilling & Greenspan

[57] ABSTRACT

A portion control liquid dispenser comprising a conductive metal liner forming the inner surface of a container or tank, an intermediate layer of insulation and an outer shell. The inner tank surface is cooled by a thermoeletric heat pump. A removable liquid container is placed within the tank so that its walls make contact with the cooled inner liner. The container is open at the top for liquid fill and venting and is coupled at its lower end to a molded element comprising a dispensing tube combination cap. The elongated dispensing tube extends downwardly within a locating structure and houses a plunger having a conical lower portion which normally blocks an aperture in the lower end of the tube. A solenoid coil is mounted about the downwardly extending tube and is activated by a selected manual switch to dispense a particular amount of liquid. The plunger normally seals the opening in the tube by gravity and head pressure from the liquid but is driven upwardly by the solenoid for a set interval dispensing a predetermined amount of liquid through an adjustable time delay circuit coupled to the switch.

12 Claims, 5 Drawing Figures

PORTION CONTROL LIQUID DISPENSER

CROSS REFERENCES TO RELATED APPLICATIONS

This application is a continuation-in-part of pending U.S. patent application Ser. No. 87,986 which was filed on Oct. 25, 1979 now abandoned.

BACKGROUND OF THE PRIOR ART

This invention relates to dispensing apparatus and particularly to apparatus for dispensing predetermined portions of liquid and more specifically, cream or non-dairy cream substitutes for coffee and similar drinks.

The most widely used conventional device for dispensing cream into coffee and other drinks involves an apparatus wherein a handle is manualy lifted to permit the flow of cream through an aperture at the base of the device. A disadvantage of this type dispenser is the fact that the entire portioned amount of liquid is released at once causing a splash or spillage when entering the cup. In contrast thereto, the present invention dispenses a portioned amount which flows from the dispenser in an interval of time simulating liquid being poured from a pitcher, etc., therefore decreasing the problem of splash or spillage. This unique dispenser may also be preset as desired for portion control. Integral means are provided for cooling the cream, whereas in conventional devices, it is usually necessary to load a chilled element into the dispenser periodically.

The prior art includes U.S. Pat. No. 3,343,721 to W. D. Paley which discloses a dispensing device for beer and other gas-charged liquids. The patent reveals a solenoid arrangement including a coil and an armature movable in response to energization of the coil. The operation of a closure member is controlled by the solenoid arrangement.

In U.S. Pat. No. 3,625,398 to Tometsko, a dispensing system controlled by a time delay mechanism is disclosed. A valve is raised into an upward position when an associated solenoid is energized.

U.S. Pat. Nos. 3,848,775 to Possell, 3,974,941 to Mettler, 3,666,144 to Winder and 3,627,176 to Sallors basically disclose the use of solenoid operated valves in aerosol apparatus where the fluid is maintained under pressure. In the present invention, the fluid flows by gravity to the opening rather than the manner disclosed in foregoing references. Furthermore, none of the references disclose a programmatic solenoid-activated dispensing arrangement for drinks such as coffee wherein the cream is maintained in a tank at a lowered temperature by integral cooling means. The use of a selected switch to activate an electronic circuit to permit dispensing of a predetermined amount of cream from a particular tank having unique advantages is nowhere disclosed in the prior art.

SUMMARY OF THE INVENTION

The present invention discloses a portion control liquid dispenser comprising an inner liner or tank fabricated from conductive metal and surrounded by insulation and then an outer shell. A thermoelectric heat pump is connected directly to the inner liner to provide cooling of the inner tank area to maintain the liquid at a safe temperature by conduction once the precooled liquid has been added. The liquid is located in a removable container having walls which make contact with the cooled wall surface of the inner liner. The liquid container is open at the top for liquid fill and venting and is coupled to a molded element at the bottom portion thereof comprising a dispensing tube combination cap. The elongated dispensing tube extends downwardly within a locating structure and houses a plunger having a conical lower portion which normally blocks an aperture in the lower part of the tube. As the liquid container is lowered into the tank, the dispensing tube positions itself in the center of a solenoid coil mounted at the base of the tank.

When the container is loaded, the liquid flows through a small hole in the cap seal and into the dispensing tube. The plunger normally seals the opening of the tube by gravity and head pressure from the liquid. The liquid is dispensed by manually energizing one of a plurality of switches which operates the solenoil coil through an adjustable time delay circuit. The coil then moves the plunger upwardly, opening the dispensing outlet for a preset time interval which determines the portion dispensed. Each of the switches corresponds to a particular time interval and, hence, a particular amount of fluid being dispensed.

Accordingly, an object of this invention is to provide a new and improved liquid dispensing apparatus.

Another object of this invention is to provide a new and improved dispensing apparatus for dispensing predetermined portions of cream and non-dairy cream substitutes for mixture with beverages, etc.

A more specific object of this invention is to provide a new and improved gravity fed dispensing apparatus for dispensing cream and non-diary cream substitutes by activation of a selected electrical switch which operates a solenoid coil, opening an outlet in the apparatus for a predetermined time interval.

DESCRIPTION OF THE DRAWINGS

Other objects and advantages of this invention may be more clearly seen when viewed in conjunction with the accompanying drawings wherein.

DETAILED DESCRIPTION OF THE INVENTION

Figure 1:
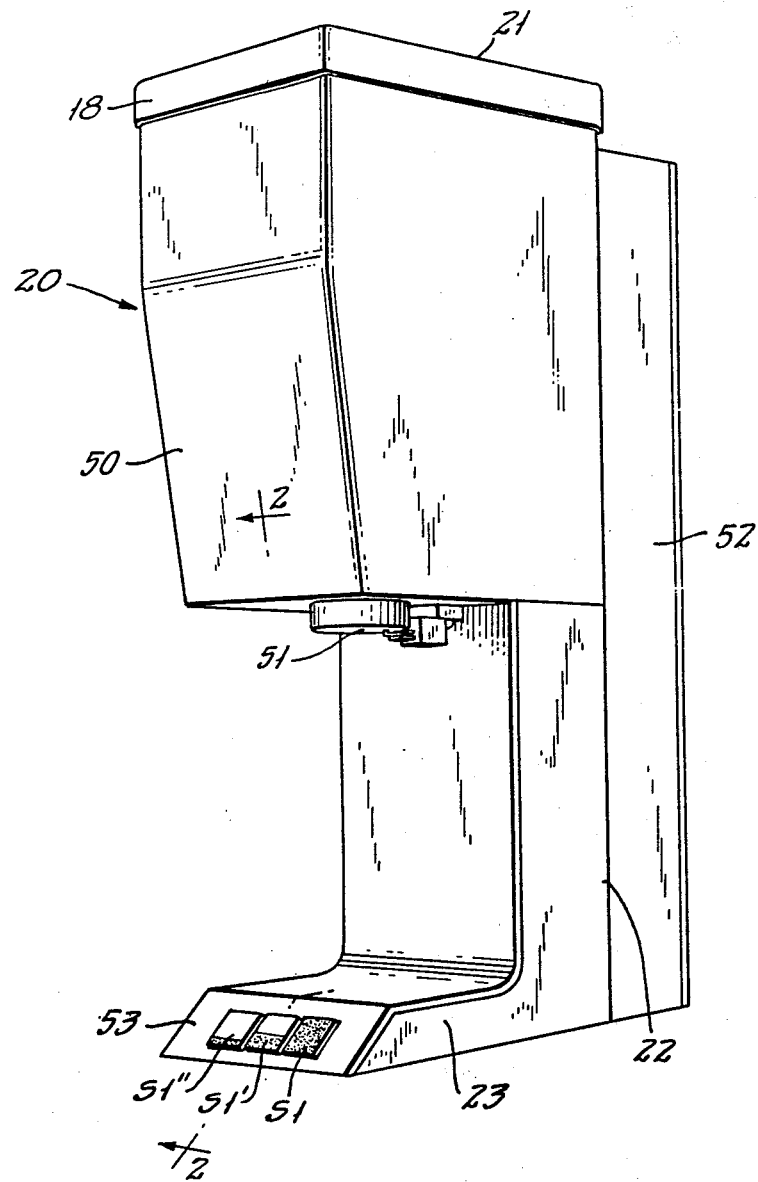
FIG. 1 is a perspective view of the dispensing view of the dispensing apparatus comprising the invention.

Referring now to FIG. 1 of the drawings, the invention comprises a liquid dispenser 20 having an upright frame 22 with an outwardly extending base 23 and a tank 50 mounted to the upper portion of said frame 22. The tank 50 extends outwardly over the base 23 at distance sufficient to permit the ready insertion of a cup beneath the tube aperture 51 to receive liquid from the tank 50. Cooling means such as a heat pump (not shown) may also be mounted to and in contact with, the tank 50 beneath the rear cover 52.

The base 23 is hollow and contains the electronic circuitry for the dispenser 20 with switches S1, S1' and S1" located on the inclined front face 53. As an alternate embodiment, the switches S1, S1' and S1" may be located on the front face of the tank 50. The switches S1, S1' and S1" may be marked with a symbol indicating whether a full cream portion of a ⅓ or ⅔ portion are to be provided. To activate the dispenser unit 20, a cup is inserted beneath the tube 4 and a selected switch is pushed.

Figure 2:
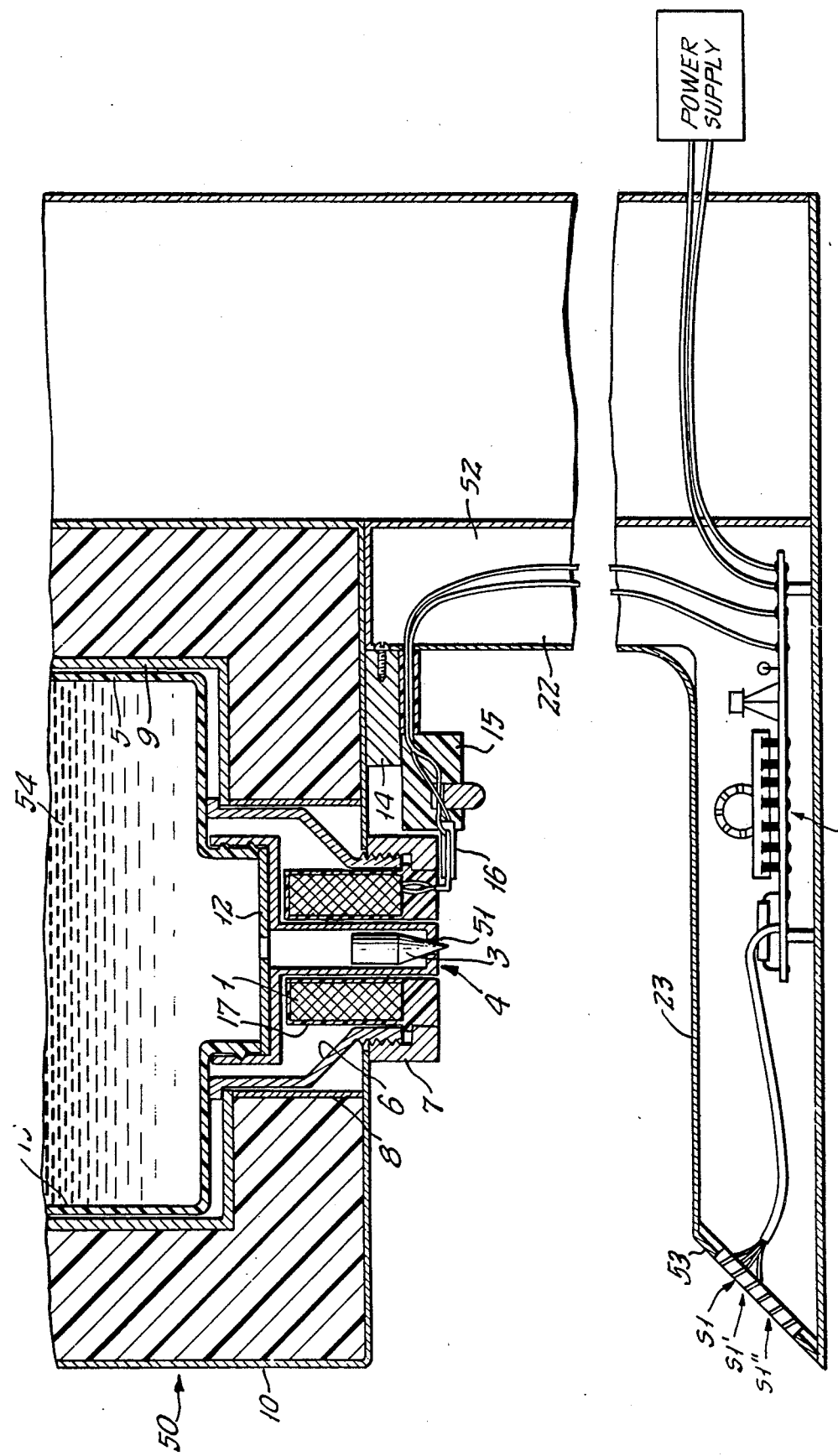
FIG. 2 is a cross-section view of the dispensing apparatus taken along the line 2—2 of FIG. 1.

As shown in FIG. 2 of the drawings, the tank 50 of the portion control liquid dispenser 20 includes an outer tank wall 10 and an inner tank liner 9 having insulation 11 of a material such as polyurethane positioned therebetween. The inner liner 9 is made of a conductive metal such as aluminum and is coupled to a thermoelectric heat pump (not shown) to maintain the liquid 54 in a chilled condition. A removable container 13 with the liquid 54 inside is placed into the tank so that its walls make contact with the cooled inner liner. The liquid container 3 is normally open at the top for liquid fill and venting and includes a cap seal 12 at its lower end which is coupled to the dispensing tube 4 for providing cream from the tank 50 on demand. A cover 21 having downwardly extending walls 18 is then positioned over the dispenser tank 50 to complete the unit.

In the dispensing mechanism 20, the electromagnetic coil 1 is encased in water tight plastic housing 17. The coil 1 is retained in the flanged guide support 6 by the threaded coil locking cap 7. These parts in conjunction with spacer bushing 8 affix the inner tank liner 9 to the outer tank wall 10 which is foamed in place with the polyurethane insulation 1. The plunger 3 is contained in the dispensing tube combination container cap 4 by the cap seal 12 which is attached to the liquid container 13.

The fixed slide mount 14 allows the sliding connector 15 to make or break contact with the coil quick connect tabs 16 for removal of the coil. The periodic activation of the electromagnetic coil 1 is initiated and controlled by the components of the electronic circuitry 2.

Figure 3:
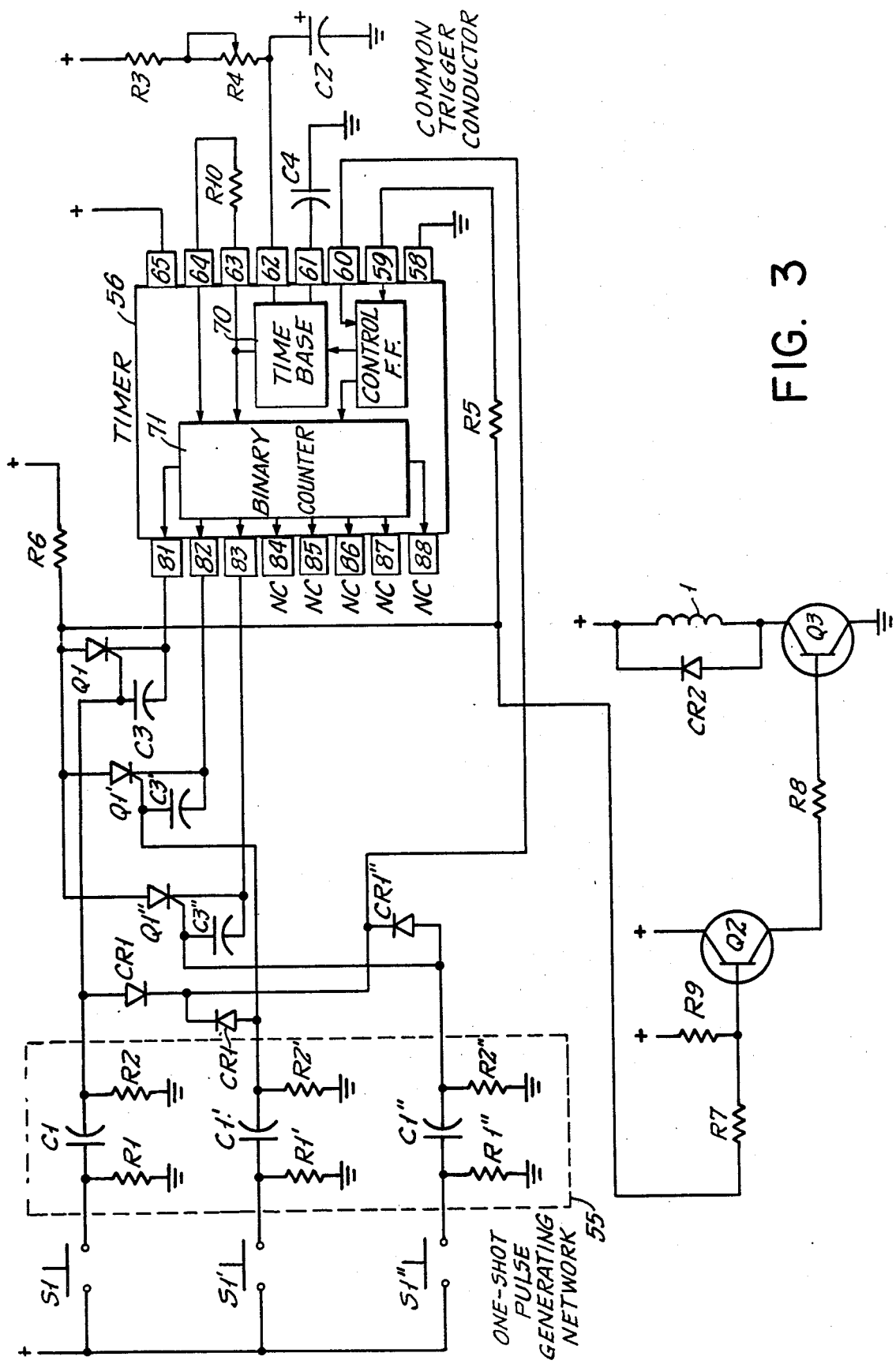
FIG. 3 is a schematic circuit drawing showing the control arrangement for the dispensing apparatus.

Referring to FIG. 3, the closing of any one of the momentary normally open pushbutton switches S1, S1', S1" applies a positive potential to one side of the respective one shot pulse generating network 55 consisting of a charging resistor R1, R1', R1", a capacitor C1, C1', C" and a pull down resistor R2, R2', R2". The generated positive going pulse triggers the gate of an appropriate silicon controlled rectifier Q1, Q1', Q1" and also triggers the programmable timer 56 at pin 60 to start through its respective blocking diode CR1, CR1', CR1". The blocking diodes are used to prevent all of the silicon controlled rectifiers from turning on through the programmable timer's common trigger conductor. The trigger input to pin 60 of 56 activates the internal time-base oscillator 70, enables the binary counter section 71 and sets all of the counter outputs, pins 81 through 88 inclusively, to the negative potential. The time-base oscillator 70 generates timing pulses with its period, T, equal to 1 RC. The RC (resistor-capacitor) network consists of resistor R3, variable resistor R4 and capacitor C2 which are connected to the timer through pin 62. The period T is adjustable by variable resistor R4 between two limits set by resistor R3. These timing pulses are counted by the binary counter section until the timer 56 is reset by a positive potential applied to reset pin 59 through resistor R5.

The binary counter outputs are internally connected open-collector transistors which when turned "on" apply a negative potential to the cathodes of their appropriately connected silicon controlled rectifiers Q1, Q1", Q1" through pins 81 through 88 inclusive. Only pins 81 to 83 are used in this circuit and their respective outputs are equal to 1T, 2T and 4T.

In a typical operation, if switch S1 is closed, its silicon controlled rectifier Q1 is turned "on" because its cathode is now at negative potential and its anode is at positive potential through current limiting resistor R6. Capacitors C3, C3', C3" are used to prevent spurious transients from turning "on" the silicon controlled rectifiers Q1, Q1', Q1". This "on" state puts the common conductor output to base resistor R7 at negative potential which turns "on" PNP transistor Q2. This in turn applies a positive potential to base resistor R8 which turns "on" NPN driver transistor Q3 that energized for time period 1T raises the plunger 3 off of the dispensing tube orfice 4 letting the liquid in the container 5 flow out. Pull up resistor R9 is used to turn transistor Q2 completely "off" when the negative potential at base resistor R7 is removed. When time period 1T has been completed, the open collector output transistor at pin 81 of the timer is turned "off" by the binary counter section 71 and the negative potential is removed from the cathode of silicon controlled rectifier Q1. This turns "off" Q1 and by doing so applies a positive potential to reset 59 of the timer 56 turning "off" the time-base oscillator 70 and disabling the binary counter section 71, thus turning "off" all of the open-collector transistors at the outputs of the timer 56, pins 81 through 88 inclusive. Pull-up resistor R10 is required for proper operation and is connected at pins 63 and 64 of the timer. Pin 61 is an external synchronous input and is not being used in this circuit, therefore it is grounded through capacitor C4.

The preceding operation is identical for switches S1' and S1" except for the time-periods. In the actual operation of this circuit, the variable resistor R4 is adjusted so that when switch S1" is pressed closed the volume of liquid that is dispensed is equal to one full portion. Then if switch S1' is pressed, a half portion will be delivered or if switch S1 is pressed, a quarter portion is dispensed.

Figure 4:
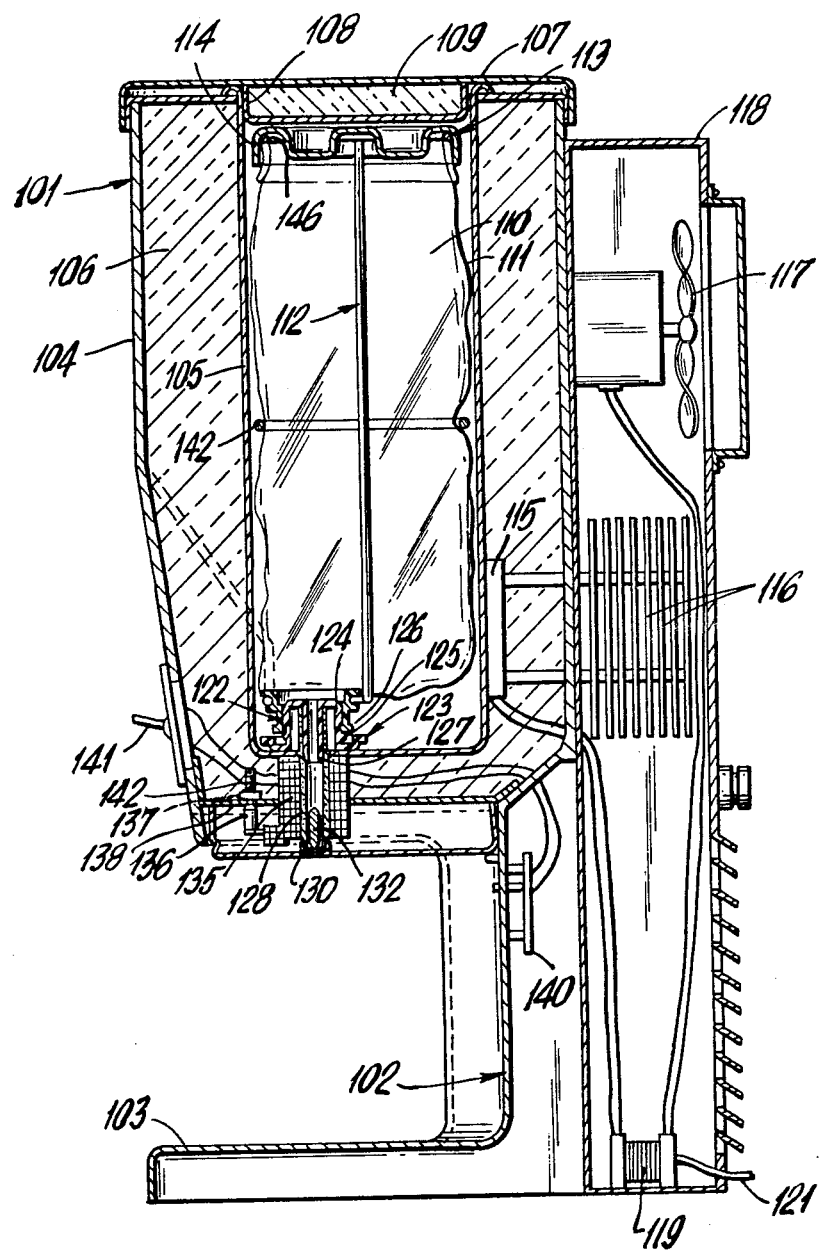
FIG. 4 is a side cross-section view of an alternate embodiment of the invention.
Figure 5:
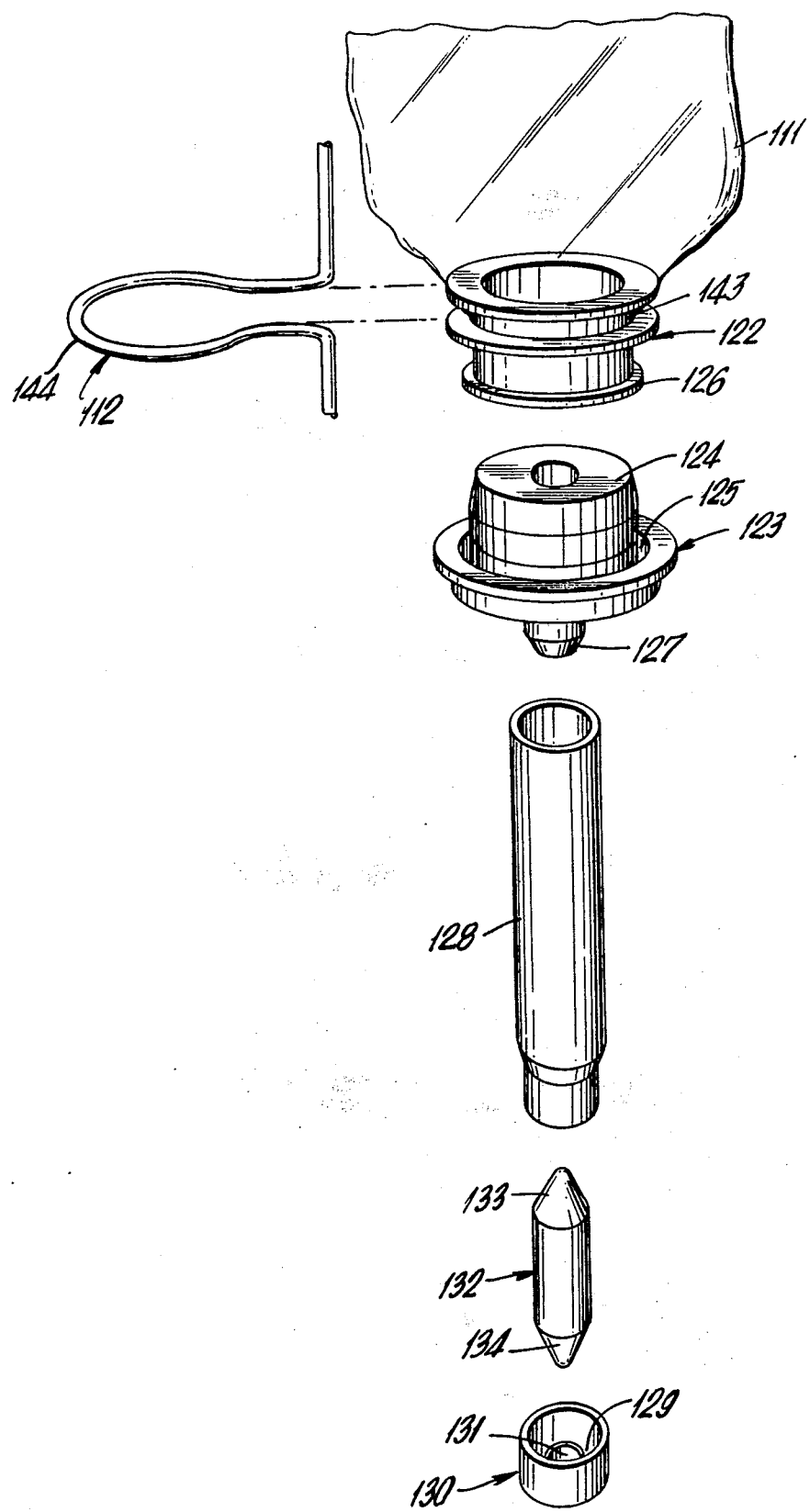
FIG. 5 is an exploded view of the dispensing assembly portion of the invention.

Referring now to the embodiment of FIGS. 4 and 5, the invention comprises an upper tank portion 101 which contains fluid 110 supported by the frame 102 and overhanging the base platform 103 of said frame 102. The tank portion 101 comprises an outer substantially cylindrical tank 104 and an inner tank 105 of lesser diameter mounted concentrically with respect to the outer tank 104. The space between the outer and inner tanks, 104 and 105, may be filled with insulation 106.

An insulator cap and lid 107 is placed over the tank portion 101 with a downwardly extending central portion 108 thereof protruding downwardly into the inner tank 105. The protruding portion 108 contains insulation 109 in the internal cavity thereof. The fluid 110 is stored in a collapsible plastic container 111 which is supported within the inner tank 105 by a wire housing 112. The upper portion 113 of the wire housing 112 is substantially circular and is designed to permit the top-edge of the plastic bag or container 11 to be folded thereover. A cream or fluid cover 114 is then placed over the outer ring 113 to prevent contaminants from reaching the product.

The inner tank 105 is essentially a conductive canister to which a thermal electric cooling unit 115 is mounted to chill the fluid 110 in the plastic container 111. The cooling fins 116 and the cooling fan 117 are mounted within the control housing 118 for activation from transformer 119. The transformer 119 is coupled to a conventional power supply (not shown) through wire 121.

A female polypropylene fitment 122 is permanently attached to the polyethylene bag or container 111. As best shown in FIG. 5, the female fitment 122 is frictionally coupled to the male fitment 123 which includes an upwardly protruding hollow portion 124 and a grooved portion 125 within which the bottom flange 126 of the female fitment 122 is located. A downwardly protruding orifice stem 127 on the male fitment 123 engages a substantially cylindrical dispensing tube 128 having a lower recessed portion which engages a groove 129 in the nipple 130. The nipple 130 includes an orifice 131 for dispensing fluid therethrough.

A plunger 132 is mounted within the dispensing tube 128 with sufficient clearance so that the fluid flows around the outer surfaces thereof. The plunger element 132 includes upper and lower conical surfaces 133 and 134, respectively. The upper conical surface 133 facilitates plunger movement through the fluid 110 while the lower conical surface 134 additionally permits a firm engagement with the nipple orfice 131 to seal the dispensing assembly when the fluid flow is shut off. The dispensing tube 128 also serves as an insulator which aids in retaining the fluid 110 such as cream inside the tank 105 at a safe temperature level. The tube 128 is also nonconductive to heat which may be dissipated by the solenoid coil 135 which surrounds the dispensing tube 128. The waterproof coil 135 is held in place by the male connectors 136 which plug into the female receptacles 137 located in the tank base 138.

More specifically, the plunger 132 is made of a magnetically conductive nickel material which seals against the nipple 130 preventing leakage of the fluid 110 through the nipple orifice 131. During energization of the solenoid coil 135, the conductive plunger 132 is lifted upward within the dispensing tube 128 permitting liquid to flow through the nipple orifice 131 for a predetermined length of time. The conductive qualities of the plunger 132 also aid in keeping its body at the temperature of the liquid 110 within the inner tank 105 thus aiding and maintaining a safe, cool temperature for the liquid 110 within the dispensing tube 128.

The nipple 130 is made of a pliable vinyl or other suitable plastic material which mounts over the lower end of the dispensing tube 128 in a friction fit. The wall of the orifice 131 is thin and pliable so that the weight of the plunger 132 forces the wall outward, permitting the plunger to penetrate the orifice opening and forming a seal between the conical plunger portion 134 and the top periphery of the cylindrically walled orifice 131. The plunger 132 terminates in a plane across the lower most edge of the orfice opening. This arrangement allows the plunger 132 to force out any liquid which was trapped within the orifice 131 during the operation. The conical end portion 134 displaces or fills most of the space within the orifice 131, thus decreasing the chance of cream collection and eventual bacterial growth.

The pliable design of the nipple 130 provides another function which is necessary after each dispensing cycle. As the plunger 132 falls downward and strikes the nipple 130, a force is generated a the center of the nipple 130 which flexes the outer wall of the nipple 130 inward against the dispensing tube 128 preventing the nipple 130 from slipping from the tube 128.

The portion control circuit board 140 which is mounted on the frame 102 is coupled to the switch 141 which activates the dispensing unit. A portion control adjusting screw 142 is located beneath the dispensing area to regulate the time duration of the pulse to the solenoid coil 135. With switch 141 held down, the coil 135 will remain energized for a duration of preset time. If switch 141 is released before the time duration is completed, the coil 135 will de-energize and the circuit will reset.

To assemble the unit, the dispensing tube 128 is mounted on the male bag fitment 123. The plunger 132 is inserted into the tube 128. The nipple 130 is attached to the end of the tube 128. The male fitment 123 is then inserted into the female fitment 122 of the plastic bag 111. The assembly is mounted to the wire housing 112 by positioning the groove 143 of fitment 122 within the semi-circular ring 144 of the wire housing 112. The body of the bag 111 is located within intermediate rings 142 while the top is folded over the top ring 146. The wire housing or basket 112 is placed in the inner tank 105 with the dispensing tube assembly being guided through the center core of the solenoid coil 135. The cream or other fluid 110 is poured into the bag 111, the cover 114 is placed over the top ring 146 and the insulated lid 107 is positioned thereover.

The portion control fluid dispenser as thus described involves a minimum of parts and throw-away bags and bag fitments. The sealing members are designed to insure a nondripping, highly cleanable, sanitary means for dispensing predetermined quantities of fluids. In contrast, prior art devices often employ internal openings and hardware such as sealing rings which are difficult to clean. Furthermore, threaded closures, which are not present in this invention, present sanitation problems in existing devices and the distance from the sealing point to the end of the dispensing tube or orifice opening permits the collection of coagulated product outside the refrigerated area in prior art devices.

It is understood that the above-described arrangements are merely illustrative examples of the application. Numerous other arrangements may be readily devised by those skilled in the art which will embody the principles of the invention and fall within the spirit and scope thereof.

We claim:
1. A portion control liquid dispenser comprising:
   a tank having a central cavity and an aperture in the base thereof,
   a housing mounted within the tank cavity and having a removable collapsible container for liquid mounted thereto and extending to the base of the housing having at the bottom thereof a female fitment including an aperture extending therethrough,
   a male fitment having a central aperture and an upwardly protruding portion design to frictionally engage the aperture in the female fitment, and a downwardly extending orifice stem,
   a dispensing tube in fluid-flow communication with said stem at its upper end and extending through the tank cavity at its lower end,
   a resilient nipple having a central aperture mounted to the end of the dispensing tube,
   a movable metal plunger mounted within the tube and having a lower end to engage the aperture in the nipple in an inactivated condition and prevent the flow of liquid therethrough,
   a solenoid coil mounted about the dispensing tube, and,
   a switch and a power supply coupled through said switch to the solenoid coil to activate said coil for a predetermined interval causing said plunger to move upwardly within the dispensing tube to dispense fluid through the nipple orifice; whereby the dispenser is rendered nondripping and sanitary by allowing said male fitment, dispensing tube, resilient nipple and movable metal plunger to be readily removed and cleaned of food products and/or other contaminants.

2. A portion control liquid dispenser in accordance with claim 1 wherein:

the plunger comprises an elongated member having a main body portion of a substantially cylindrical configuration, a conical upper portion and a conical lower portion which engages the nipple orifice to control the flow of liquid therethrough and wherein the plunger is of a lesser diameter than the tube to permit the movement of liquid along the walls thereof.

3. A portion control liquid dispenser in accordance with claim 1 further including:

a cover having a downwardly extending peripheral portion mounted over the housing to enclose the liquid container and a lid having a downwardly extending peripheral portion mounted over the upper surface of the tank and including a downwardly extending central portion which engages the central cavity in the tank.

4. A portion control liquid dispenser in accordance with claim 1 wherein:

the tank comprises inner and outer substantially cylindrical tanks, the inner tank being mounted concentricaly with regard to the outer tank and further including insulation mounted between the walls of said tanks.

5. A portion control liquid dispenser in accordance with claim 1 wherein:

the housing comprises at least one elongated wire member extending along the length of the tank cavity, an upper ring member mounted transversely to the elongated member to permit wrapping of the edge of the collapsible container over the edges thereof, an intermediate transverse ring supporting said container and a lower semi-circular transverse ring designed to engage a groove in the female fitment to position said member in place with respect to the base aperture.

6. A portion control liquid dispenser in accordance with claim 1 wherein:

the nipple comprises a substantially cylindrical outer wall portion, a base having a central aperture and an upwardly protruding cylindrical portion surrounding said aperture and forming a groove with the outer walls and wherein said groove is frictionally engaged by the dispensing tube.

7. A portion control liquid dispenser in accordance with claim 1 wherein:

the male fitment includes a downwardly projecting orifice stem which frictionally engages the upper portion of the dispensing tube, an intermediate flanged portion extending outwardly from the stem, a circular groove in the upper surface of the flanged portion and an upwardly protruding portion having a central aperture, the groove being engaged by the female fitment and said protruding element being mounted concentrically within said female fitment.

8. A portion control liquid dispenser in accordance with claim 4 further including:

a thermal electric cooling unit mounted against the wall of the inner tank to maintain the liquid in the container at a predetermined temperature.

9. A portion control liquid dispenser in accordance with claim 1 wherein:

the collapsible container is of a plastic material and the nipple is made of a pliable material.

10. A portion control liquid dispenser in accordance with claim 6 wherein:

the lower end of the plunger comprises a conical configuration which facilitates engagement with the cylindrical portion surrounding the nipple aperture and wherein the tip thereof is at rest in a plane approximately across the lower edge of the nipple aperture to force out any liquid which was trapped within the cylindrical aperture.

11. A portion control liquid dispenser in accordance with claim 1 further including:

adjustment means for regulating the time duration of the pulse to the solenoid coil.

12. A portion control liquid dispenser comprising:

a liquid container having an aperture at the lower end thereof, a removable holding means for the liquid including fitments sealingly enclosing the container aperture at the lower end thereof, an elongated dispensing tube extending downwardly, from and removably attached to said fitments and having a lower dispensing aperture extending therethrough, an elongated plunger movably located within the tube and normally sealing the dispensing aperture under gravity and head pressure of the liquid, and, means for operating said plunger to dispense a predetermined amount of liquid through the dispensing aperture by moving said plunger upwardly away from an out of sealing engagement with the aperture, whereby at least one of said fitments, dispensing tube and plunger can be removed from said container and cleaned of food products and/or other contaminants, wherein the means for operating the plunger comprises a coil mounted about the plunger and said plunger being a conductive metal; and, circuit means including a plurality of manually actuatable switches, a one shot pulse generating network connected to said switches to provide a positive output pulse corresponding to a particular actuated switch, a silicon controlled rectifier corresponding to each switch and having a gate triggered by said output pulse, a programmable timer activated by the output pulse to produce timing pulses with adjustable period corresponding to the actuated switch and activate blocking diodes to prevent rectifiers corresponding to the other switches from turning on, and a driver circuit connected to the timer and operated by the timing pulses, said driver circuit operating the coil for a time period corresonding to the selected switch to dispense a predetermined amount of liquid.

* * * * *